Patented Aug. 25, 1953

2,649,759

UNITED STATES PATENT OFFICE 2,649,759

TREATED CLAY ANIMAL LITTER

S E Gibbs, Corydon, Iowa

No Drawing. Application October 5, 1950,
Serial No. 188,648

2 Claims. (Cl. 119—1)

My invention relates to the art of providing small animals and poultry with dry, sanitary, dustless and odorless shelters and other enclosures. Specifically I have devised a material for use as a poultry litter and bedding for small animals such as dogs, cats and young pigs that acts alternately on the principles of capillary action and evaporation to maintain the bed, poultry house or the like in a dry condition that is sanitary and healthful.

For the sake of simplicity in presentation, I deal with the problems presented to but one class of persons who will find my invention useful and beneficial. The advantages that my litter and bedding material will offer to the turkey raisers of the world will be paralleled to a greater or lesser degree by many other livestock raisers. This discussion will be confined to turkey raising, therefore, merely for purposes of illustration and explanation and without any intention to limit the scope of my invention thereby.

In the natural habitat, turkeys are free to roam over relatively large areas so that the problem of concentrated droppings does not present itself. When the bird became domesticated, however, large numbers were raised in confined areas. This relative crowding is particularly true of the young turkeys. Under these confined conditions, the droppings of the young birds pile up rapidly and becomes quite odoriferous. Furthermore, the birds will sometimes eat their own droppings and those of other birds which although unpleasant sounding is harmful in effect only when some of the birds are sick. When one or more of the young birds are sick, however, this eating of the droppings causes the sickness to spread and in some instances has reached catastrophic proportions for individual turkey raisers.

To avoid the spread of disease by having some of the turkeys eat diseased droppings of other birds, it has been customary to place some material in the pens where the young turkeys are kept that will tend to cover up or hide the droppings so that the birds cannot find and, therefore, eat the same. This material is known as litter and numerous materials have been used with varying degrees of success. Straw and wood shavings are two materials that have been used. Neither of these was particularly good for the purpose. They are both easily dampened to the point that they make ideal breeding grounds for disease germs. When the young birds ate the shavings, they frequently died in large numbers. To be of any value at all, these materials had to be changed very frequently and the disposal of the dirty shavings or straw is no easy matter.

Peat moss has also been used with a greater degree of success than can be claimed for wood shavings or straw. The moss had a fairly high absorption rate and would dry out by itself if the weather were not too adverse. The moss is too soft, however, to be a really good material. In a comparatively short time it breaks down into a dusty mass. From the time that it breaks down, the moss is of little or no value as a material for covering and drying the droppings from the birds.

Another material that has been used to some advantage over wood shavings and straw is diatomaceous earth. Most successful usage was found to be from having the material in rather large chunks. The diatomaceous earth, however, is very soft and chalky. One can take a piece of this material and by rubbing it over the hand get off a line of the powdery material that is the earth. So soft is this earth that even the light weight of the young turkeys walking over it causes it to powder. This white powder deposits itself all over the brooder house. In some cases when the young turkeys' feet are damp, the chalk sticks to them and cakes to the point that the birds are crippled and unhappy. Under such physically uncomfortable conditions, the birds do not do well. Another and probably more serious drawback to any chalking and dusting material resides in its tendency to irritate the nasal passages and other mucous membranes in the head and pulmonary system. Also, of course, air bourne bacteria thrive in a dusty air. In spite of its early popularity, therefore, the diatomaceous earth has some shortcomings.

What is needed is a material that is hard enough to resist powdering when dry and mudding when it gets wet. Furthermore, the material should be capable of drying out by itself and have such great water holding capacity that it will not fail to operate even in periods of high humidity. It is also desirable that the material be of such a nature that it will either kill germs directly or at the very least present an atmosphere so unattractive to bacterial growth and development that practically no germs will be found in the droppings only a short time after they have been released from the birds. An alternative is that the material should cover the droppings until they can be dried out to the point where they will not support the life of the germs. It is also desirable that the material be one that the turkeys can eat without harm should they be so inclined. It has also been found that the main reason that the turkeys eat certain droppings is that they stand out from the litter on the floor. Experiments proved that the litter itself would be eaten only if some part of it could be singled out from the balance. The ideal litter material should therefore either cover or camouflage the droppings and be nearly uniform in coloring itself.

With the shortcomings of the prior art in mind and the desirable features of an ideal litter similarly so, it is the principal object of my invention to provide a fowl litter and small animal bedding that is porous, hard, light in weight, uniform in color, and chemically alkaline.

It is a further object of my invention to provide a method of drying and deodorizing small animal and poultry enclosures.

It is a further object of my invention to provide a litter and bedding material that is durable in use and inexpensive to manufacture.

These and other objects will be apparent to those skilled in the art.

My invention consists in the combination of materials into a means for instituting my method of drying and deodorizing small animal and poultry enclosures as described in the following specification and specifically set out in the appended claims.

I have discovered that certain clays are well adapted to use as a poultry or small animal enclosure floor in that these clays may be treated to attain a remarkable degree of porosity and hardness. The porosity of the end product coupled with the hardness makes for a litter or bedding material that dries the feces dropped thereon by capillary action. The hardness of the material causes it to resist dusting and therefore avoids clogging of the outer openings of the numerous tiny holes that cause the capillary action drying of the feces and other waste products. Thus this new clay material I have discovered for use as a means for instituting my method of drying the floors or ground surfaces of poultry and small animal enclosures will continue its drying action even in rather humid periods. Furthermore, there is no dusting from this material to coagulate on the feet or legs of the birds or animals which is a solution to certain problems presented by earthen materials used heretofore for the purposes set out above. Also of course since the moisture is never sealed in the clay particles or pieces, it will dry out readily as soon as the weather conditions are such that evaporation can take place.

Although several clays were more or less successfully used, one was found to be particularly so. The particularly effective clay had a chemical analysis substantially as follows:

| | |
|---|---|
| $SiO_2$ per cent | 67.5 |
| $MgO$ do | 11.0 |
| $Al_2O_3$ do | 12.0 |
| $CaO$ do | 2.5 |
| $Fe_2O_3$ do | 3.5 |
| Other do | 3.25 |
| Free moisture, as produced do | 10–14 |
| Ignition loss (total volatile content at 1800° F.) per cent | 17–22 |
| Water soluble salts per cent | Less than 0.1 |
| Specific gravity | 2.2–2.4 |
| Bulk density (representative of the material in a packed condition) lbs. cu. ft | 32–34 |
| Particle shape (electron microscope) | Spicular |
| pH in distilled water | 6.4–7.2 |

Clay of the above analysis was found to have extraordinarily good capillary action when it was merely dried in the sun. Furthermore, when the clay was dried it became rather hard and resisted dusting when dry and mudding when wet. I discovered, however, that by heating this clay artificially to temperatures in the 1600° F. to 1800° F. range that its hardness and porosity were further increased. A still further increase in porosity was obtained by mixing the clay into a slur or mud and then variously or in combination beating air into the slur, adding $CO_2$ gas, or adding gas-forming chemicals that tended to create air pockets and therefore, increase the capillary action of the clay particles as well as decrease its weight which is important in shipping the material. It was also discovered that clays not as well adapted to this use because they have less porosity than that of the clay noted particularly above could be made to serve reasonably well by the use of these porosity increasing techniques noted earlier in this paragraph.

It was also found possible when the clay was first mixed into a slur before it was hardened that other materials could be mixed into the slur which would furnish the end product with additional desirable properties. For example, disinfectants such as pine oil, creosote and even earth molds were used successfully. The last mentioned of these while the most desirable remains prohibitively expensive at the moment. It is possible that it may be used at some later date, however, when technical progress as yet unimagined makes its use practical. Another example of adding other materials to the slur is the use of coloring matter at this stage of the production. It was found in tests that turkeys at least would single out and eat pieces of the material that were of noticeably different color than the majority of the litter. It was found therefore, advantageous to add some harmless coloring matter that would make all of the material come out a drab color such as grey, black or brown. Alkali such as soda ash ($N_2 CO_3$) was added to neutralize the acidity of the waste products. This neutralizing of the acid content helped with the drying action to hold down odors caused by reaction of the acid with metal materials in the clay. It is known, furthermore, that disease germs do not find an alkali substance to their liking. Adding the alkali produces a two-fold benefit, therefore, by reducing the germ potential and neutralizing the acidity of the waste products to prevent the otherwise odoriferous reaction of the acid with certain elements of the clay. It was also possible to remove these metal materials and thus render the clay immune to the odors otherwise caused by the reaction of the acid and metals. By washing the clay with any acid that will react with iron and magnesium, these metals were substantially removed from the clay as active ingredients. The exact nature of the chemical reaction is not known to me, but I do know from my experiments that when the clay was treated with sulphuric acid ($H_2SO_4$), for example, to drop the pH value from the 6.4–7.2 range to the 6.1–6.2 range that an odor similar to the odor produced by poultry body acids on the raw clay was produced. Furthermore, the treated clay after being permitted ample time for the acid to work, would not become odoriferous when used with poultry. The acid treated clay was also treated with an alkali such as soda ash to raise the pH value of the clay to about 7.5. When soda ash or a similar alkali was added to the clay without first treating the clay with acid, the pH value that was found satisfactory was about 7.5 also. I also found that super phosphate ($Ca(H_2PO_4)_2$) could be used as a pH value raising material. From my observations, the soda ash was the most economical and best base substance.

In use the litter or bedding material is simply spread over the floor of the house or the ground area within the enclosure. The birds or animals will not cause the hardened material to crush or dust under their weight and still it is full of tiny holes that draw the moisture from the feces or draw in liquid waste products by capillary action to keep the pen or like dry and therefore, almost incapable of supporting germ life. When the disinfectant is combined, any germs that are not killed by the dryness are killed by the chemical agent. The drying of the waste matter that results from this capillary action also minimizes odor. As a further means of retarding the development of odor, there is the alkali that is added at the slur stage. By using this acid neutralizing agent, the acids of the waste products are prevented from attacking the metal salts in the clay for a considerable period of time. Even without the alkali or removing the metal salts, however, it was found that these clay particles that have been heat hardened would keep a pen practically free of odor for a period of from five to six weeks. This five to six week figure is particularly impressive in view of the very short period that a given batch of wood shavings or the like can be used. Wood shavings or saw dust usually must be changed every two or three days at considerable cost in both material and labor. Because my earthen material may be used for a considerable period of time, its initially higher cost is quickly compensated for by its relatively long life as a litter. Furthermore, the tests were run in the hospital pen of the turkey farm which is normally one of the worst offenders in this respect. When the material was used in small form for young birds the waste products floated to the top as light dry particles that could be raked off. If the concentration of birds did not become too great, the same litter apparently would serve almost indefinitely. In the case of larger birds and those that were closely crowded, a larger diameter of material was found to be much more desirable. In the case of the larger material, however, the waste products dropped down between the larger chunks which prevented the waste matter from splattering up on the birds' legs or feet. As the larger birds walked over these larger particles, they rolled around and contacted the waste matter at numerous points which caused a drying action similar to that produced by the smaller material with young birds. For the small and unconcentrated birds a diameter of one-sixteenth of one inch was found to work satisfactorily. In the case of the largest birds in the greatest concentrations, the chunks should be nearly one inch or more in diameter for the best results.

Although not claimed by me as part of this invention, it is also true that the litter material is easily disposed of should it ever become saturated to the point that it must be dispensed with. Because of its water holding properties and its hardness and resistance to mudding, this clay may be mixed in the garden plot or any place where planting is to be done. It carries the animal proteins that it has taken in with it. Some of these proteins are washed out into the ground with each rain over a period of years. Furthermore, this material holds water during the rainy season helping to prevent the buildup of rivulets that cause surface erosion and leaching or vertical erosion resulting from the too rapid soaking in of the rain. The material also helps to keep the soil light and capable of taking in rain in its own right to the greatest possible extent. For these reasons this material presents no problems disposalwise as is true of wood shavings and straw which in very dry climates may not deteriorate to the point of mixing readily with the soil for several years. It was also found, however, that this hardened earthen material was not water solvent and could be washed with water to remove waste products. The liquor that is run off may be concentrated and used for fertilizer if that is desired. When the earthen material was thoroughly dried it was as good as new and would serve again equally as efficiently as new litter.

It should be clear by this time that I have discovered a new method and means of keeping the floors and ground surfaces of shelters and other enclosures for poultry and small animals clean, dry and odorless. That the material I use is readily found in many parts of the country. That it is inexpensive to acquire and process, and that it presents many material differences and advantages over the prior art.

Another tremendous advantage of my litter over most materials used is its fireproof quality and combined therewith its ability to absorb oil. Because the action of my litter is primarily a mechanical one of drawing in liquids by capillary action, it will draw in oils as well as water or waste liquids from animals. It is a great advantage for the floor litter to be oil absorbent because most brooder houses or the like use oil heaters to maintain warmth. When one of these stoves leaks, it creates a fire hazard unless the spilled oil is taken up by the litter.

Some changes may be made in the construction and arrangement of my method of and means for drying and deodorizing the lowest surface of poultry and small animal enclosures without departing from the real spirit and purpose of my invention, and it is my intention to cover by my claims, any modified forms of structure or use of mechanical equivalents which may be reasonably included within their scope.

I claim:

1. A poultry and small animal litter composed of clay of the following formula: $SiO_2$ 67.5%, $MgO$ 11%, $Al_2O_3$ 12%, $CaO$ 2.5%, $Fe_2O_3$ 3.5% and other 3.25%, heated to at least 1600° F. and broken into pieces less than one inch in diameter.

2. A poultry and small animal litter composed of clay of the following formula: $SiO_2$ 67.5%, $MgO$ 11%, $Al_2O_3$ 12%, $CaO$ 2.5%, $Fe_2O_3$ 3.5% and other 3.25%, heated to at least 1600° F. and broken into pieces less than one inch in diameter, said particles being artificially, uniformly and drably colored after being broken into smaller pieces.

S E GIBBS.

References Cited in the file of this patent

UNITED STATES PATENTS

| Number | Name | Date |
| --- | --- | --- |
| 1,967,333 | Smith | July 24, 1934 |
| 2,014,900 | Lapp | Sept. 17, 1935 |
| 2,279,405 | Laughlin | Apr. 14, 1942 |
| 2,351,686 | Kohl | June 20, 1944 |
| 2,376,672 | Dreyling | May 22, 1945 |
| 2,470,346 | Frankenhoff | May 17, 1949 |
| 2,477,892 | Paquette | Aug. 2, 1949 |